Oct. 15, 1935.   H. L. GEBHARDT   2,017,436
WEEDING DEVICE
Filed Jan. 16, 1935
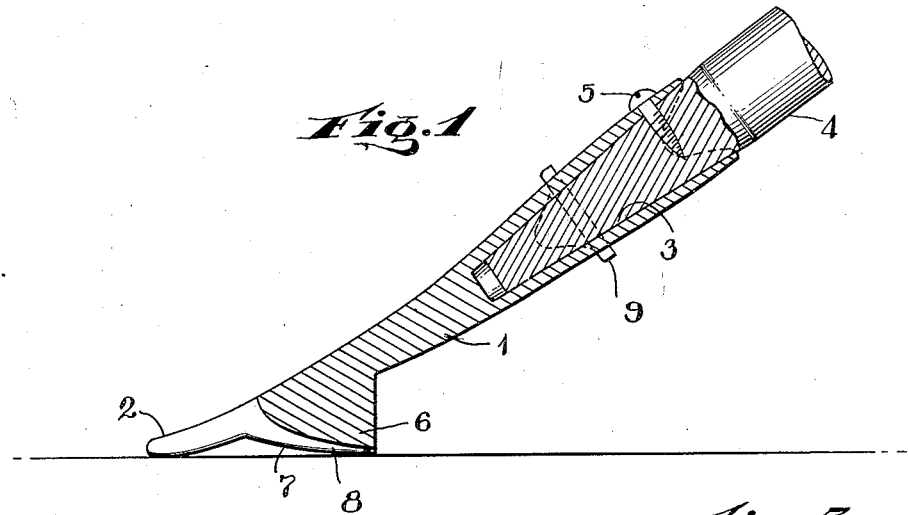
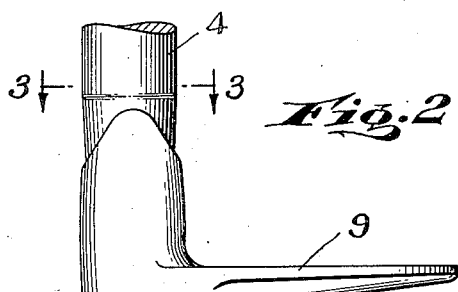
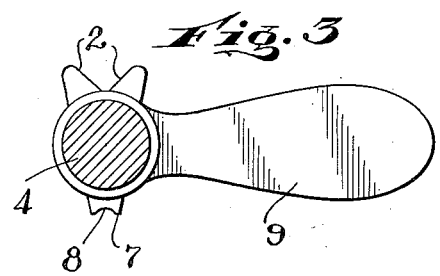
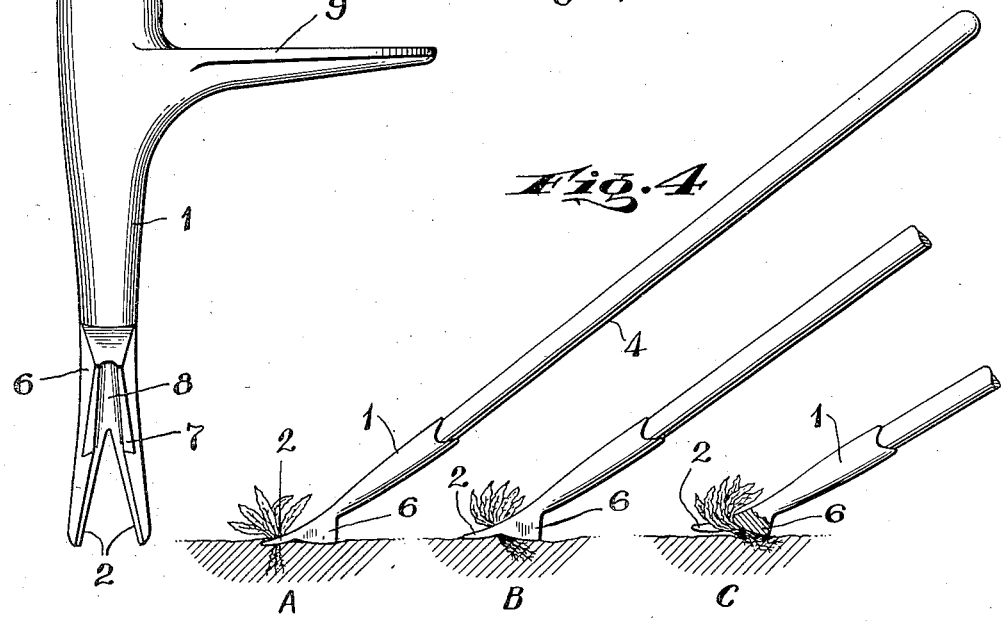
INVENTOR
HENRY L. GEBHARDT
BY
*Kiddle, Bethell & Montgomery*
ATTORNEYS Patented Oct. 15, 1935

2,017,436

UNITED STATES PATENT OFFICE 2,017,436

WEEDING DEVICE

Henry L. Gebhardt, Cliffside Park, N. J.

Application January 16, 1935, Serial No. 1,982

6 Claims. (Cl. 254—132)

My invention relates to weeding devices and is particularly directed to a manually operated device for removing weeds and the like from the ground.

Devices have been provided heretofore for removing or pulling weeds but such devices have not been satisfactory, owing to their more or less complicated construction or because they cut the weeds, leaving the root in the ground. In the hand pulling of weeds and also with many of the so-called mechanical pullers, an unsightly hole is left in the ground due to pulling up more soil than is necessary.

One of the objects of my invention is the provision of a device which is very rapid in action and which will overcome the objections above mentioned, and will eliminate the necessity of bending to pull the weed, my improved device furthermore being devoid of all moving parts.

Another object of my invention is the provision of a device which will readily pull the weed together with its roots entirely out of the ground without disrupting the soil or making a hole therein any larger than is necessary to permit the roots to be withdrawn.

Other objects of my invention will be manifest from the following description and the accompanying drawing in which Fig. 1 is a perspective view of the device;

Fig. 2 is a rear elevation;

Fig. 3 is a sectional view taken on line 3—3 of Fig. 2; and

Fig. 4 shows the device in the various positions assumed when in use.

Referring to the drawing in detail 1 designates a body member having a fork 2 at one end and a socket 3 at the other end for receiving a handle 4 which may be secured in said socket in any suitable manner, such as by a screw 5, for example.

The bottom face of the fork 2 it will be observed from the drawing is convex or curved upwardly with respect to the longitudinal axis of the device.

On the rear or convex face of the device, at the base of the fork 2 is a projection or cam 6, extending from the fork 2 rearwardly at an angle thereto, the forward face 7 of this cam being provided with a groove 8 extending the length of the cam face and merging into the V of the fork.

The body member 1 is provided with a laterally extending member or step 9, adjacent the upper end thereof, this member by reason of its weight functioning properly to position the device on the ground, that is to say, if the device is resting upside down on the ground, the step 9 will rotate the device into proper position. The step also functions, as a step when using the device on hard ground as will be understood.

The entire device with the exception of the handle 4 is preferably made of one piece of light metal, such as aluminum, for example, although if desired, the handle may also be made of metal and integral with the body member 1.

In use the device is held at an angle to the ground as shown in Fig. 4 and the stem of the weed is straddled by the fork 2. If pressure is now applied to the device, by pressing on the step 9 for example, the fork 2 will enter the ground to the extent permitted by the projection or cam 6, as shown at A in Fig. 4, engagement of this cam with the surface of the ground preventing further inward movement of the device and causing the same to move forward more or less parallel to the surface of the ground in the direction of the weed, as shown at B in Fig. 4, with a tendency for the front end of the fork to ride out of the ground, crowding the roots of the weed into the fork and into the groove 8 which merges into the V of the fork, as shown at C in Fig. 4, so that the weed and its roots will be removed comparatively free of dirt and leaving a hole in the ground not substantially larger than the compressed weed roots.

It will be understood that various changes and modifications may be made in the structure herein illustrated and described without departing from the spirit and scope of my invention.

What I claim is:—

1. A weed pulling device comprising a body member having a forked end for straddling the stem of the weed and an integral portion having a groove for receiving the roots of the weed, said groove merging into the V of the forked end for receiving the root of the weed as the same is withdrawn from the ground.

2. A weed pulling device comprising a body member having a fork for straddling the stem of a weed, a grooved member adjacent the fork for receiving the roots of the weed, said member extending at an angle thereto for engaging the ground upon movement of the device to weed-straddling position to deflect the fork in the direction of the weed to crowd the root of the weed into said groove.

3. A weed pulling device comprising a body member having a fork for engaging the stem of the weed and being curved upwardly with respect to the longitudinal axis of the body member, and a root-receiving portion extending at an angle to said fork and in alignment therewith, said root-receiving portion being formed to fit the root of the weed.

4. A weed pulling device comprising a body member, one end of which is concave or curved upwardly with respect to the longitudinal axis of the member, a fork formed in said end for straddling the stem of a weed, an integral cam member on the convex side of said body member and extending at an angle to said fork for engaging the ground, a root-receiving groove in said cam member, said groove merging into the V of said fork, a step integral with said body member for assisting the cam action and a handle for said device.

5. A weed pulling device comprising a body member, one end of which is convex or curved upwardly with respect to the longitudinal axis of the member, a fork formed in said end for straddling the stem of a weed, an integral cam member on the convex side of said body member and extending at an angle to said fork adapted upon movement of the device to weed straddling position to engage the ground to deflect the fork in the direction of the ground, and a root-receiving groove in said cam member, said groove merging into the V of said fork.

6. A device of the class described comprising a body member, the upper side of one end of which is curved upwardly with respect to the longitudinal axis of the body member, a fork formed in said end, a projection on the under side of said body member, said projection being provided with a groove extending the full length thereof and merging into said fork, a weighted projection displaced circumferentially on said body member from said first mentioned projection, a socket in the end of said body member opposite said fork, a handle in said socket and means for securing the same therein.

HENRY L. GEBHARDT.